(12) United States Patent
Servais et al.

(10) Patent No.: US 10,794,035 B2
(45) Date of Patent: Oct. 6, 2020

(54) FASTENER FOR CONSTRUCTION ELEMENT

(71) Applicant: RBS SPRL, Eghezée (BE)

(72) Inventors: Pierre Servais, Eghezée (BE); Bernard Servais, Ramillies (BE)

(73) Assignee: RBS SPRL, Eghezee (BE)

( * ) Notice: Subject to any disclaimer, the term of this patent is extended or adjusted under 35 U.S.C. 154(b) by 722 days.

(21) Appl. No.: 15/320,129

(22) PCT Filed: May 28, 2015

(86) PCT No.: PCT/EP2015/061846
§ 371 (c)(1),
(2) Date: Dec. 19, 2016

(87) PCT Pub. No.: WO2015/197302
PCT Pub. Date: Dec. 30, 2015

(65) Prior Publication Data
US 2017/0130418 A1    May 11, 2017

(30) Foreign Application Priority Data

Jun. 26, 2014 (BE) .................................. 2014/0495

(51) Int. Cl.
*E02D 5/76* (2006.01)
*E02D 35/00* (2006.01)
(Continued)

(52) U.S. Cl.
CPC ............... *E02D 35/00* (2013.01); *E02D 7/02* (2013.01); *E02D 11/00* (2013.01); *E04B 1/40* (2013.01); *F16B 35/06* (2013.01)

(58) Field of Classification Search
CPC .. E02D 5/74; E02D 5/76; E02D 5/801; E02D 5/803; E04H 12/2223; E04H 12/223; E04H 12/2215
See application file for complete search history.

(56) References Cited

U.S. PATENT DOCUMENTS 6,273,390 B1 * 8/2001 Meyer ................. E04H 12/2215
                                                    248/507
6,298,611 B1 * 10/2001 Oliver .................... E02D 5/801
                                                    248/156

(Continued)

FOREIGN PATENT DOCUMENTS

CA       1084280 A      8/1980
DE      93 12 522    * 12/1993  ............... E04B 1/26

(Continued)

*Primary Examiner* — Michael P Ferguson
(74) *Attorney, Agent, or Firm* — Reinhart Boerner Van Deuren P.C.

(57) ABSTRACT

The present invention relates to a fastening tab for a construction element, preferably a beam, a panel or a slab, that is adjustable vertically and relative to the horizontal, that can be screwed to a support with inner thread, preferably a foundation screw, successively comprising:
 a fastening screw comprising a beveled head and a threaded shank;
 a metal plate pierced with a beveled opening that can accommodate said fastening screw and comprising fastening means to the construction element;
 a perforated flexible joint;
 a screw comprising a machined beveled head with an inner thread corresponding to that of said fastening screw; such that the position of the screw relative to the support, which is obtained by screwing/unscrewing, allows vertical adjustment of the metal plate;
characterized in that the fastening screw, the beveled aperture of the metal plate and the flexible joint cooperate to allow angular adjustment of the metal plate relative to the horizontal plane.

20 Claims, 8 Drawing Sheets

(51) Int. Cl.
*E02D 7/02* (2006.01)
*E02D 11/00* (2006.01)
*E04B 1/41* (2006.01)
*F16B 35/06* (2006.01)

(56) References Cited

U.S. PATENT DOCUMENTS

| | | | |
|---|---|---|---|
| 6,347,489 B1 * | 2/2002 | Marshall, Jr. | E02D 27/00 |
| | | | 248/354.5 |
| 2004/0103599 A1 * | 6/2004 | Keck | E02D 5/801 |
| | | | 52/155 |
| 2005/0188627 A1 | 9/2005 | Alberts | |
| 2011/0250977 A1 | 10/2011 | Reisch | |

FOREIGN PATENT DOCUMENTS

| | | |
|---|---|---|
| DE | 202004003022 U1 | 6/2004 |
| EP | 2602405 A1 | 6/2013 |
| JP | 2013-194365 A | 9/2013 |

* cited by examiner

FASTENER FOR CONSTRUCTION ELEMENT

FIELD OF THE INVENTION

The present invention relates to the technical field of construction.

It more particularly relates to a tab for fastening to a support with inner thread, preferably for a foundation screw. The fastening tab according to the invention allows to fasten a light construction element thereto such as a beam, a panel or a slab, etc., included in the manufacture of a terrace, a garden shed, a photovoltaic panel, etc.

BACKGROUND OF THE INVENTION

Foundation corner studs to be screwed into the ground, also called foundation screws, are e.g. known from documents DE 20 2004 003 022 U1 and US 2011/0250977 A1. Such studs are made up of a metal or plastic body, intended to be screwed into the ground and receiving, in its upper part, a more or less light construction element such as a beam, a board or a panel.

However, such devices do not allow to level the elements that they support. Yet, it may be necessary to adjust these elements after they have been laid due to movement of the ground, for example.

To that end, there are devices that are made up of adjustable studs for prefabricated construction elements, such as footing blocks. Document CA 1,084,280 discloses such a device whereof the laying, on a support such as a concrete pile foundation, for example, is to be achieved by a professional in the field. A leveling element comprises a base plate having an aperture for receiving the apex of a pile remaining above the ground level and side walls having indentations for receiving prefabricated footing blocks, whereby a continuous support with footing blocks can be formed on piles, the tops of which remain above ground level with uneven heights.

However, this embodiment is more costly and tedious than that using foundation screws.

Document EP 2 602 405 A1 relates to a set of foundation screws, each screw being made up of two elements: an element ending with a hollow conical end with an outer thread according to a continuous helical thread making up a drilling zone and with inner thread according to a finer pitch to receive a support element comprising a screw allowing to adjust the height of the foundation screw.

Document JP 2013194365 A discloses a foundation screw structure in which the construction element can be adjusted in terms of height, but also horizontally in both orthogonal directions. The height adjustment is achieved using an adjusting screw, while the horizontal adjustment uses a screw that can slide in an oblong aperture. Two types of oblong apertures oriented in both orthogonal directions allow a fine horizontal adjustment of the position of the construction element.

There is a need to be able to adjust a construction element after it is laid not only in the vertical and horizontal directions, but also by an angle of inclination relative to the horizontal plane. No document in the state of the art describes such an adjustment.

AIMS OF THE INVENTION

The invention aims to provide a fastening tab for a support with inner thread not presenting the drawbacks of the state of the art.

In particular, the invention aims to propose a fastening tab allowing precise adjustment of the construction element after it has been laid in the vertical direction, but also by an angle relative to the horizontal plane.

MAIN CHARACTERISTIC ELEMENTS OF THE INVENTION

A first aspect of the invention relates to a fastening tab for a construction element, preferably a beam, a panel or a slab, that is adjustable vertically and relative to the horizontal, that can be screwed to a support with inner thread, preferably a foundation screw, successively comprising:
  a fastening screw comprising a beveled head and a threaded shank;
  a metal plate pierced with a beveled aperture that can accommodate said fastening screw and comprising means for fastening to the construction element;
  a perforated flexible joint;
  a screw comprising a machined beveled head with an inner thread corresponding to that of said fastening screw; such that the position of the screw relative to the support, which is obtained by screwing/unscrewing, allows vertical adjustment of the metal plate;
characterized in that the fastening screw, the beveled aperture of the metal plate and the flexible joint cooperate to allow angular adjustment of the metal plate relative to the horizontal plane.

According to preferred embodiments of the invention, the fastening tab will comprise at least one, or a suitable combination, of the following features:
  the inclination angle of the bevel of the fastening screw is greater than or equal to the inclination angle of the bevel of the opening of the metal plate;
  the diameter of the aperture of the metal plate, including the bevel, is larger than the maximum diameter of the head of the fastening screw;
  the metal plate has a downward curvature comprised between 0.1 and 2 mm, preferably 1 mm;
  the flexible joint is made from at least two different polymers, preferably polyamide and EPDM, respectively;
  the flexible joint is made from at least two different polymer layers, preferably three layers;
  the fastening screw is a screw with a hexagonal imprint, preferably made of stainless steel or galvanized steel;
  the fastening screw comprises a bevel with an inclination angle comprised between 30° and 50°, preferably 45°;
  the screw is a hexagonal head screw;
  the fastening tab can be angularly adjusted relative to the horizontal plane according to an angle comprised between 0° and 20°, preferably between 5° and 15°;
  the fastening tab can be vertically adjusted by between 0 and 10 cm;
  the fastening tab further comprises an accessory for the metal plate comprising a vertical flap and a curved horizontal flat that can accommodate the perforated metal plate. Preferably, the vertical flap and the horizontal flat form an angle comprised between 80° and 100°.

A second aspect of the invention relates to a foundation screw mounted with a fastening tab as above.

A third aspect of the invention relates to the use of a fastening tab as described above with a foundation screw for the manufacturing/mounting of terraces, garden sheds or solar panels.

A fourth aspect of the invention relates to a method for mounting a fastening tab, as described above, for a construction element, that can be screwed to a support with inner thread, preferably a foundation screw, comprising the following steps:

fastening a support with inner thread in the ground;
screwing a screw comprising a machined beveled head with inner thread in the support, in a relative position of the screw and the support that allows vertical adjustment of the fastening tab;
laying a perforated flexible joint by centering it relative to the machining of the screw head;
placing a metal plate pierced with a beveled aperture on the flexible joint;
securing the metal plate to the screw comprising a machined beveled head using a fastening screw comprising a beveled head traversing the metal plate, the perforated flexible joint being screwed into the inner thread of the screw, while moving the bevel of the fastening screw sideways, before fastening, relative to the bevel of the metal plate, so as to adjust the inclination of the metal plate relative to the horizontal plane by an angle comprised between 0 and 20°.

BRIEF DESCRIPTION OF THE DRAWINGS

FIG. 2 shows a perspective view (FIG. 2A), an elevation view (FIG. 2B) and a sectional view (FIG. 2C) of a screw comprises a machined head with a thread.

FIG. 3 shows a planar view (FIG. 3A) and a sectional view (FIG. 3B) of a flexible joint.

FIG. 4 shows a planar view (FIG. 4A) and a sectional view (FIG. 4B) of a metal plate that can receive a construction element such as a sleeper.

FIG. 7 is a perspective view of a fastening tab according to the invention screwed into a foundation screw according to an angle of 0° relative to the horizontal (FIG. 7A) or according to an angle of 10° relative to the horizontal (FIG. 7B).

DESCRIPTION OF A PREFERRED EMBODIMENT OF THE INVENTION

The invention is described in more detail below using FIGS. 1 to 9.

Figure 1:
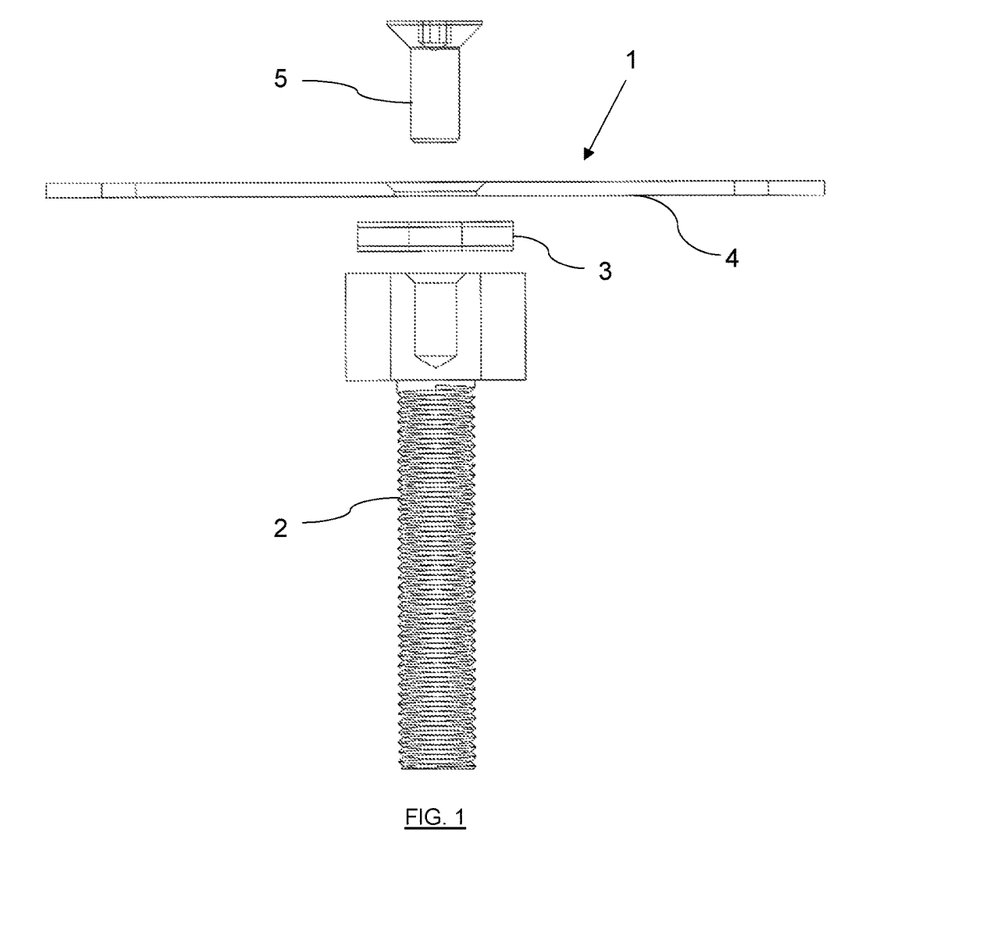
FIG. 1 is a cross-sectional view of a fastening tab to be screwed into a support, according to the invention. This structure comprises a screw with an inner thread head (FIG. 2), a flexible joint (FIG. 3), a perforated metal plate (FIG. 4) and a fastening screw (FIG. 5).
Figure 7A:
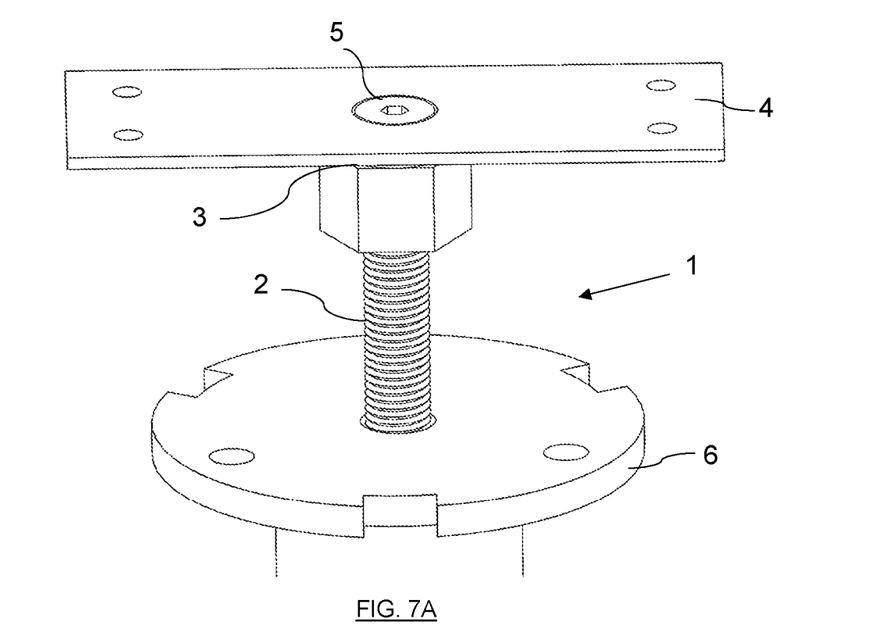
Figure 7B:
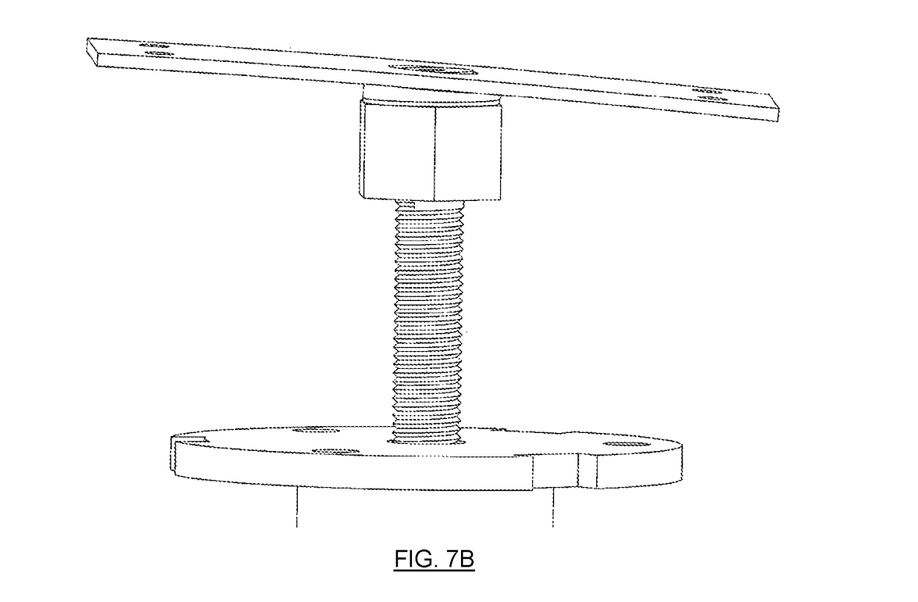
Figure 9:
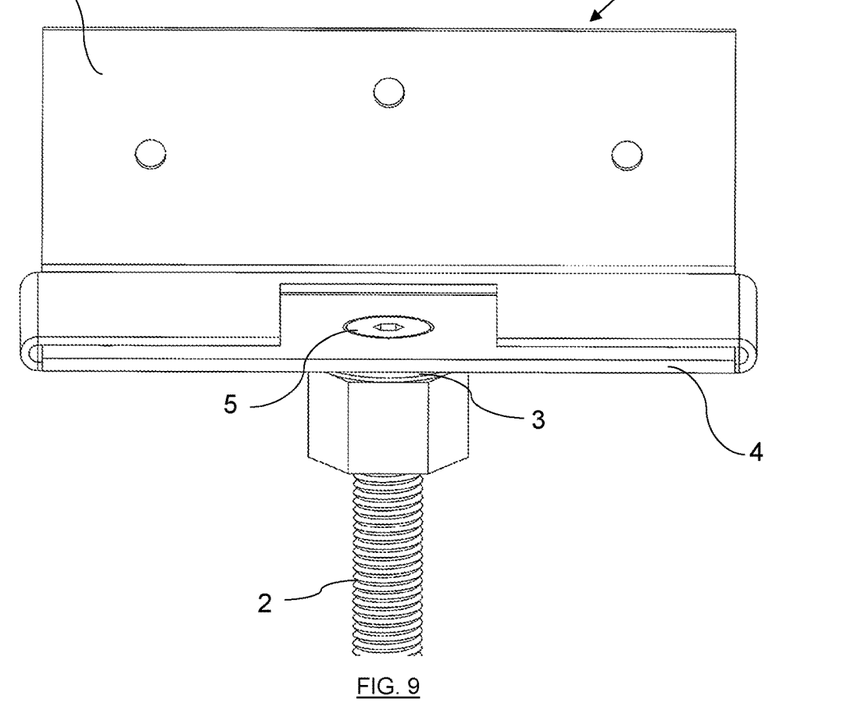
FIG. 9 is a perspective view of a fastening tab according to the invention whereof the metal plate is provided with an accessory that allows the lateral screwing of the construction element.

FIG. 1 shows an example fastening tab 1 for a support with inner thread 6 according to the invention (see FIGS. 7 and 9). The support 6 is preferably a foundation screw. However, it is not limited to a foundation screw, and may also correspond to any metal or plastic support that can accommodate a threaded part.

Figure 2A:
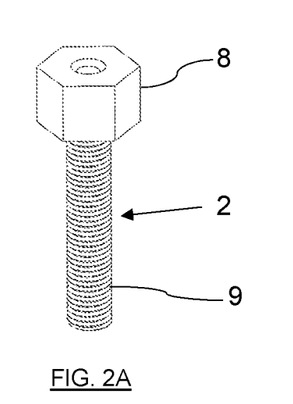
Figure 2B:
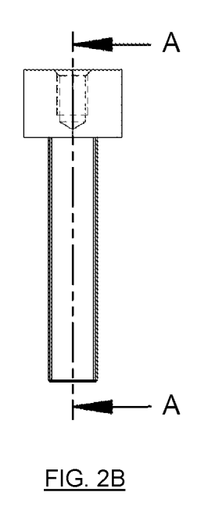
Figure 2C:
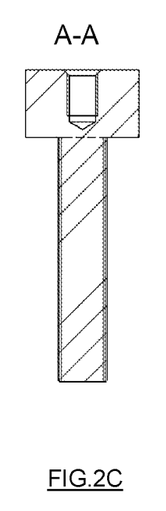

FIG. 2A shows a perspective view of the screw 2 with an inner thread head that can also, owing to its outer thread, be screwed into a support 6 with inner thread. It has a hexagonal head 8 and an outer thread 9. An example of a screw 2 representative of the invention is a M16 screw (16 mm diameter) with a hexagonal head 8 measuring 32 mm in diameter machined with a M10 thread (10 mm diameter). The screw 2 is made from steel with 15 µm electro-galvanizing covering the entire part. FIG. 2B shows a profile view of the screw 2 and FIG. 2C shows a sectional view along section A-A. The hexagonal head has an inner thread over 15 mm and has a bevel inclined by 45° relative to the horizontal over a depth of 2 mm.

Figure 3A:
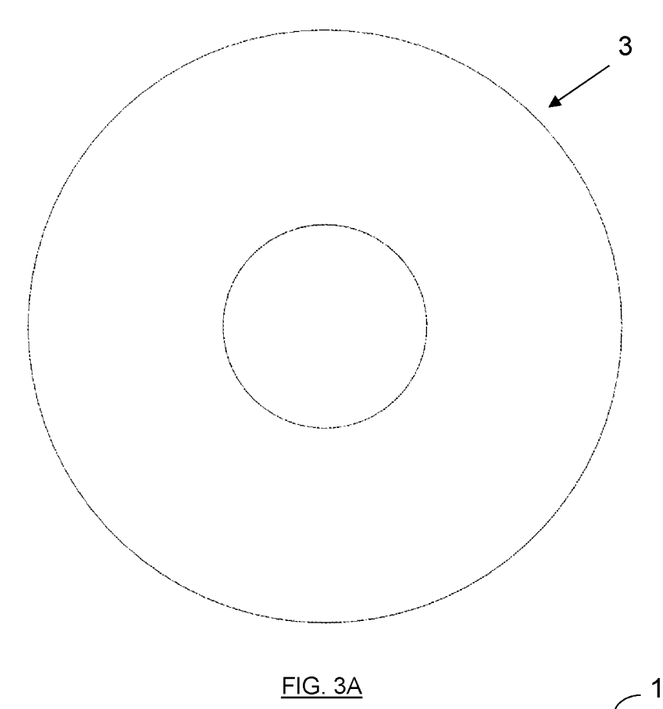
Figure 3B:
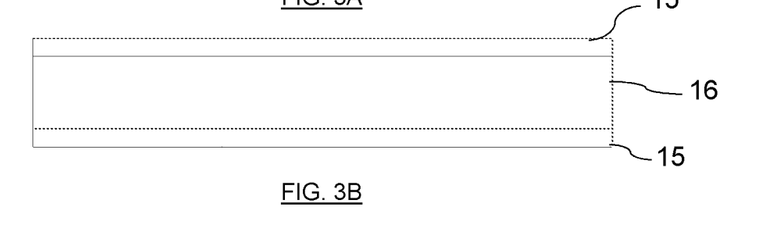

FIG. 3A shows a detail and top view of the flexible joint 3. It has a central aperture with a diameter of 12 mm. It is the flexible nature of the joint that will allow an angular adjustment of the metal plate 4 relative to the horizontal. A sectional view of the flexible joint 3 is shown in FIG. 3B. In this illustration, the joint has three layers, a central layer 16 that is 3 to 5 mm thick and two outer layers 15 each measuring 1 mm. In this example, the total thickness of the joint is comprised between 5 and 7 mm. The polymers used are preferably polyamide on the outside and EDPM (ethylene-propylene-diene monomer) at the center.

Figure 4A:
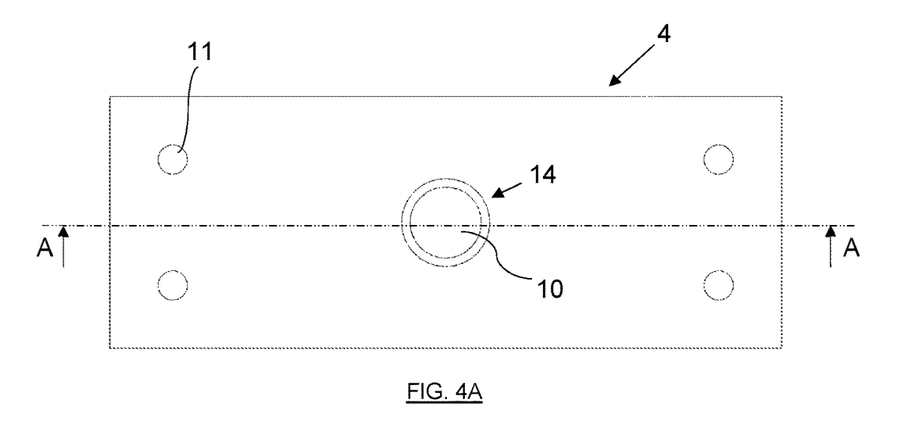
Figure 4B:
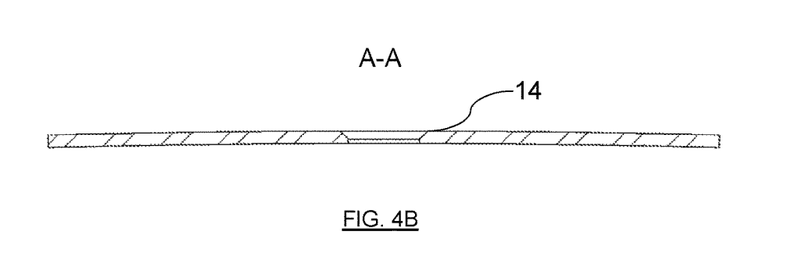

The metal plate 4 is shown in 4A in top view. It has a central orifice 10 with a diameter of 17 mm to allow the passage of the fastening screw 5. The plate also has orifices 11 on its periphery to allow the fastening of the plate to a construction element such as a beam or a sleeper, for example made from wood. The construction element is fastened on the top of the metal plate using screws inserted into the orifices 11 from below the metal plate 4. FIG. 4B shows a sectional view along section A-A, i.e., at the level of its central orifice 10. This orifice comprises a bevel 14 for example inclined by 45° relative to the horizontal over a thickness of 2 mm that may or may not exactly correspond to the bevel 13 of the fastening screw head 5. FIG. 4B also shows that the metal plate 4 is slightly curved or sintered downwardly over about 1 mm. This distance represents the gap of the plate at its end relative to the horizontal. This feature is intended to facilitate the connection with the support 6 and to prevent its motion owing to a spring effect.

The construction element is however not limited to a wooden part such as a sleeper or a beam. It may be made from wood, metal, polymer or a mixture of these components, depending on the user's needs. It is understood that the metal plate 4 is not limited to the embodiment shown in FIG. 4. Alternatives within the reach of those skilled in the art exist in order to adapt this part to the dimensions and components of the construction element fastened to it.

Figure 5:
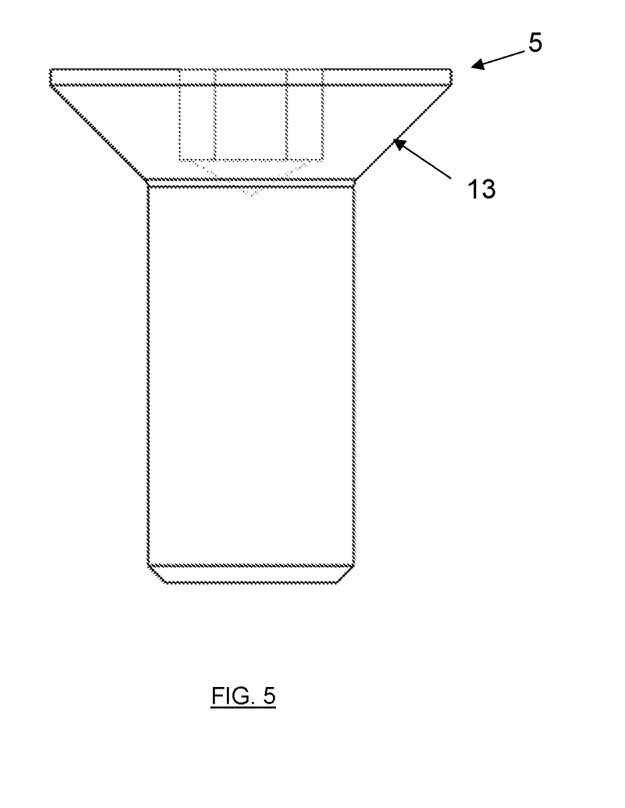
FIG. 5 shows an elevation view of a fastening screw that can be screwed into the threaded screw head of FIG. 2 and that can be inserted into the orifice of the flexible joint and of the metal plate shown in FIGS. 3 and 4, respectively.

FIG. 5 shows a profile (elevation) view of a fastening screw 5 that can be screwed into the screw 2 with a threaded head. This fastening screw 5 is preferably a screw with hexagonal imprint (six hollow faces) called HH (hollow hex) or Allen screw.

Figure 6A:
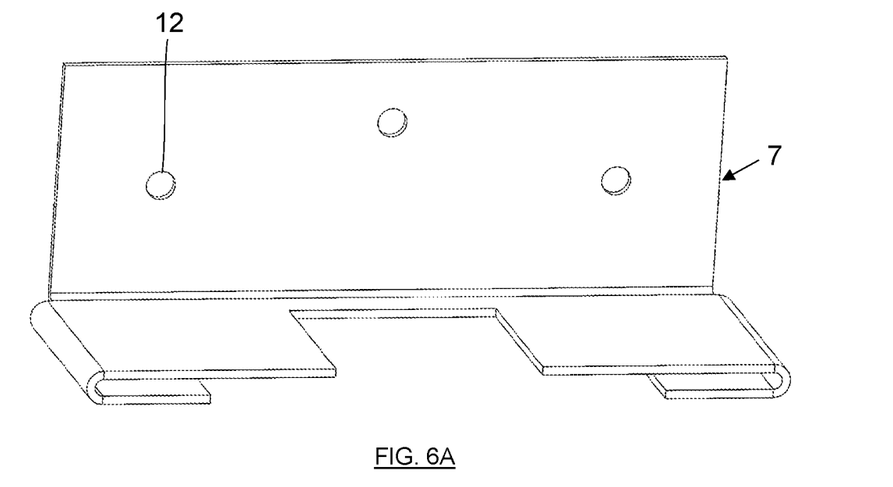
FIGS. 6A, 6B and 6C show different views of an accessory allowing to slide the metal plate therein and that can be laterally fastened to a construction element.
Figure 6B:
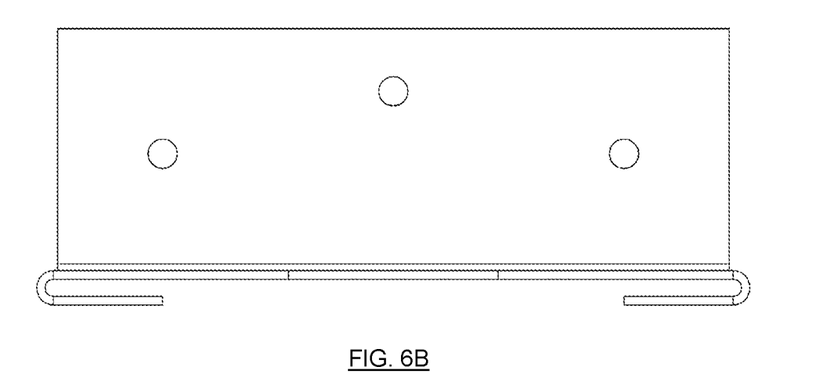
Figure 6C:
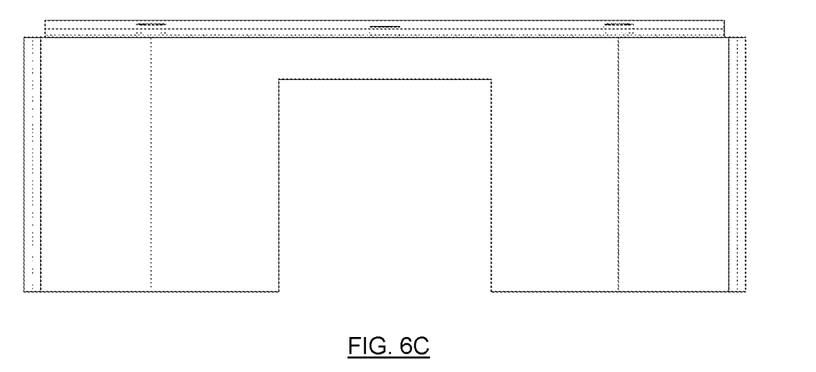

FIG. 6A is a perspective view of an accessory 7 for adaptation on the metal plate 4. The construction element is generally fastened on the top of the metal plate using screws inserted into the orifices 11 from below the metal plate 4. However, when the space below the plate is insufficient to insert the screws allowing to fasten the construction element, the accessory 7 provides a solution to this problem by allowing to fasten the construction element using screws that are inserted laterally. It is preferably achieved from a bent and machined stainless metal plate. This accessory 7 comprises a vertical flap, shown in FIG. 6B, comprising orifices 12 allowing the fastening of a construction element laterally and a horizontal flat, shown in FIG. 6C, that is curved and capable of accommodating the perforated metal plate 4, which can slide therein. The horizontal flat also comprises an empty space corresponding to the central perforation 10 of the metal plate 4. The angle formed between the vertical flap and the horizontal flat of the accessory 7 is slightly smaller than 90°, approximately 88°. When the construction element is fastened to the vertical flap, the flap stands up and forms a right angle with the horizontal flat.

FIG. 7 illustrates the complete mounting of the fastening tab 1 in a support 6 with no inclination relative to the horizontal (FIG. 7A) and with an inclination of 10° (FIG. 7B), respectively. The principle of angular adjustment relative to the horizontal plane is as follows: the bevel 14 of the central orifice of the metal plate 4 is for example identical to that of the fastening screw 5 and is 45°. The fastening screw 5 is assembled with the threaded head screw 2 and blocked abutting at the thread bottom. The flexible joint 3 is then precisely compressed. When the plate is inclined (FIG. 7B), the flexible joint 3 will compress on the side of the inclination while it ensures the stability of the metal plate 4, the countersunk head of the fastening screw 5 pivoting in the bevel 14 of the central orifice of the metal plate 4. This pivoting is possible if the diameter of the central orifice 10 of the metal plate 4 (including the bevel 14) is larger than the maximum diameter of the head of the fastening screw 5.

FIG. 7 also illustrates how the fastening tab 1 can be vertically adjusted. It is the screwing or unscrewing of the threaded head screw 2 in the support 6 that allows this height adjustment. The support 6 is for example a foundation screw 6 as disclosed in document US 2011/0250977 A1 of the company Terrafix. Its length is generally comprised between 0.5 and 2 m.

Figure 8:
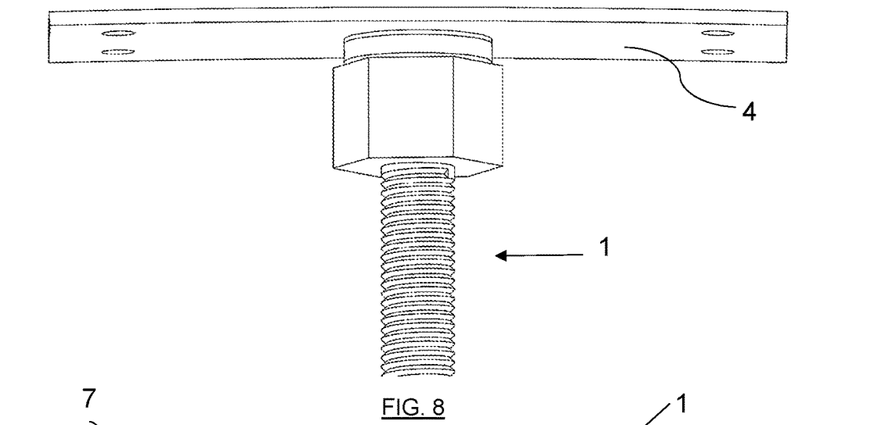
FIG. 8 is a perspective view of a fastening tab according to the invention comprising a metal plate that is slightly downwardly curved.

FIG. 8 shows a perspective view of the fastening tab 1 in which the metal plate 4 has a slight downward curvature (see FIG. 4B).

FIG. 9 shows a fastening tab 1 according to the invention in which the metal plate 4 is slid into the curved horizontal flat of an accessory 7 as shown in FIG. 6. This accessory 7 allows the lateral screwing of the construction element when the space below the metal plate is limited.

It is understood that the embodiments diagrammatically shown in FIGS. 1 to 9 and described above are merely non-limiting example embodiments and that alternatives may be provided thereto by those skilled in the art without extending beyond the scope of the claims.

Primary Advantages of the Invention

Furthermore, the invention provides several advantages, that are summarized below:
the fastening tab according to the invention allows sound insulation at the level of the construction element owing to the presence of the flexible joint;
the fastening tab allows precise vertical adjustment of the construction element, the adjustment being achieved before or after the construction element is laid;
the fastening tab allows precise adjustment of the construction element according to a certain angle relative to the horizontal plane;
the precision of vertical adjustment and relative to the horizontal plane is 0.5 mm.

LIST OF REFERENCE SYMBOLS

1. Foundation tab
2. Threaded head screw
3. Flexible joint
4. Perforated metal plate
5. Fastening screw
6. Support with inner thread
7. Accessory for metal plate
8. Screw head of the threaded screw
9. Thread of the threaded screw
10. Central orifice of the metal plate
11. Orifice for fastening to the construction element on the metal plate
12. Orifice for fastening to the construction element on the accessory for the metal plate
13. Bevel of the fastening screw
14. Bevel of the perforated metal plate
15. Outer layer of the flexible joint
16. Central layer of the flexible joint

The invention claimed is:

1. A fastening tab assembly (1) affixing a construction element, that is adjustable vertically and pivotably relative to a horizontal plane, to a support with an inner thread (6), the assembly successively comprising:
a first fastening countersunk screw (5) comprising a beveled head (13) and a threaded shank;
a metal plate (4) pierced with a beveled opening (14) that can accommodate said first fastening countersunk screw (5), the metal plate defining a fastening tab configured to be received by a mounting bracket affixed to the construction element;
a flexible polymer washer (3) having a central opening;
a second screw (2) comprising a machined beveled head with an inner thread corresponding to that of the threaded shank of said first fastening screw (5) and a threaded shank, wherein the position of the second screw (2) relative to the support (6), obtained by screwing/unscrewing the threaded shank of the second screw into the inner thread of the support, allows vertical adjustment of the metal plate (4);
wherein the fastening tab (1) is assembled by screwing the first fastening screw (5) into the inner thread of the second screw (2) through the beveled opening of the metal plate (4) and the central opening of the flexible polymer washer (3), so that the metal plate (4) and the polymer flexible washer are located between the respective heads of said screws (5,2), the flexible washer being compressed between the metal plate and the head of the second screw;
characterized in that the diameter of the metal plate (4) beveled opening is larger than the maximum diameter of the first fastening countersunk screw (5) head so that the metal plate (4) beveled opening pivotably receives the first fastening countersunk screw (5) head, enabling the construction element affixed to the metal plate (4) to be angularly adjusted to an inclined position relative to the horizontal plane, wherein when pivoted to the inclined position, the flexible polymer washer (3) is peripherically compressed, more on a first portion of the washer than on a second portion of the washer, on a side of the metal plate (4), between the metal plate (4) and the head of the second screw (2).

2. The fastening tab assembly according to claim 1, characterized in that the inclination angle of the bevel (13) of the first fastening screw (5) head is greater than or equal to the inclination angle of be bevel (14) of the opening of the metal plate (4).

3. The fastening tab assembly according to claim 1, characterized in that the metal plate (4) has a downward curvature between 0.1 and 2 mm.

4. The fastening tab assembly (1) according to claim 3, wherein the metal plate (4) has a downward curvature between 0.1 and 1 mm.

5. The fastening tab assembly according to claim 1, characterized in that the flexible washer (3) is made from at least two different polymers.

6. The fastening tab assembly according to claim 5, the at least two different polymers are polyamide and EPDM respectively.

7. The fastening tab assembly according to claim 1, characterized in that the flexible washer (3) is made from at least two different polymer layers (15, 16).

8. The fastening tab assembly according to claim 7, wherein the flexible washer (3) is made from three layers.

9. The fastening tab assembly according to claim 1, characterized in that the first fastening screw (5) is a screw with a hexagonal imprint.

10. The fastening tab assembly according to claim 9, wherein the first fastening screw with a hexagonal imprint is made from one of stainless steel and galvanized steel.

11. The fastening tab assembly according to claim 1, characterized in that the first fastening screw (5) head comprises a bevel with an inclination angle between 30° and 50°.

12. The fastening tab assembly according to claim 11, wherein the inclination angle is between 30° and 45°.

13. The fastening tab assembly according to claim 1, characterized in that the second screw (2) is a hexagonal head screw.

14. The fastening tab assembly according to claim 1, characterized in that it can be angularly adjusted relative to the horizontal plane according to an angle between 0° and 20°.

15. The fastening tab assembly according to claim 14, wherein the angle is between 5° and 15°.

16. The fastening tab assembly according to claim 1, characterized in that it can be vertically adjusted by between 0 and 10 cm.

17. The fastening tab assembly according to claim 1, characterized in that it further comprises an accessory (7) for the metal plate (4) comprising a vertical flap and a curved horizontal flat that can accommodate the metal plate (4).

18. The fastening tab assembly according to claim 16, characterized in that the vertical flap and the horizontal flat form an angle between 80° and 100°.

19. The fastening tab assembly (1) according to claim 1, wherein the construction element is one of a beam, a panel and a slab.

20. The fastening tab assembly (1) according to claim 1, wherein the support is a foundation screw.

* * * * *

UNITED STATES PATENT AND TRADEMARK OFFICE
CERTIFICATE OF CORRECTION

PATENT NO. : 10,794,035 B2
APPLICATION NO. : 15/320129
DATED : October 6, 2020
INVENTOR(S) : Pierre Servais et al.

Page 1 of 1

It is certified that error appears in the above-identified patent and that said Letters Patent is hereby corrected as shown below:

In the Claims

Claim 18, Line 1 incorrectly reads "The fastening tab assembly according to claim 16," but should read -- The fastening tab assembly according to claim 17, --

Signed and Sealed this
Tenth Day of November, 2020

Andrei Iancu
*Director of the United States Patent and Trademark Office*